US007523288B2

(12) United States Patent
Gerber et al.

(10) Patent No.: US 7,523,288 B2
(45) Date of Patent: Apr. 21, 2009

(54) DYNAMIC FRAGMENT MAPPING

(75) Inventors: Robert H. Gerber, Bellevue, WA (US); Vishal Kathuria, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 281 days.

(21) Appl. No.: 11/470,586

(22) Filed: Sep. 6, 2006

(65) Prior Publication Data
US 2008/0059749 A1  Mar. 6, 2008

(51) Int. Cl.
G06F 12/00 (2006.01)
G06F 13/00 (2006.01)
G06F 13/28 (2006.01)
G06F 9/26 (2006.01)
G06F 9/34 (2006.01)
G06F 7/00 (2006.01)
G06F 17/30 (2006.01)
G06F 17/00 (2006.01)

(52) U.S. Cl. .................. 711/171; 711/157; 711/165; 711/170; 711/173; 711/202; 711/210; 707/7; 707/100; 707/101; 707/200; 707/204; 707/205

(58) Field of Classification Search .......... 711/170–171
See application file for complete search history.

(56) References Cited

U.S. PATENT DOCUMENTS

| 5,555,404 A | * | 9/1996 | Torbj.o slashed.rnsen et al. ............ 707/202 |
| 6,523,036 B1 | * | 2/2003 | Hickman et al. ............ 707/10 |
| 7,162,478 B2 | * | 1/2007 | Gerber et al. ............ 707/100 |

OTHER PUBLICATIONS

Kulkarni, U.R. Using Semantic Knowledge of Partitioning and Allocation of Data in Distributed Databases. Jan. 1991. System Sciences. pp. 146-154.*
Tamhankar, Ajit. Database Fragmentation and Allocation: An Integrated Methodology and Case Study. May 1998. IEEE Transactions on Systems, Man, and Cybernetics. pp. 288-305.*

* cited by examiner

Primary Examiner—Kevin L Ellis
Assistant Examiner—Ryan Bertram

(57) ABSTRACT

A dataset is divided into pieces and stored at multiple locations and the system dynamically increases or decreases the number of storage locations where the pieces of the data set may be stored. A data structure comprises a first data field including a first index and a first element, and one or more data fields each with an index and an element. The elements of the one or more data fields include a token representing a location associated with the index of the first data field. A data row of a data set is mapped to the index of a data field using a second index. The second index is derived from a data row of the data set using a hash function. The second index is then mapped to the index of a data field included in the one or more data fields using a modulus function.

11 Claims, 13 Drawing Sheets

DYNAMIC FRAGMENT MAPPING

BACKGROUND

Database systems may store a set of tabular data having rows and columns in a variety of ways. A database system may store data in volatile and non-volatile memory, in a file located in conventional file storage local to the database system, in a file located in conventional file storage attached to one or more storage systems located on a network, or the like. A database system may typically add or remove data to a set of data and therefore the set of data may shrink or grow over time.

However, as a set of data grows, the set of data may grow too large and may exceed the storage capabilities of the location where it is stored. For example, a data set may be stored as a file on a hard disk drive. If the data set grows larger than the capacity of the hard disk drive, the data set may either be moved as a whole to a hard disk drive with larger capacity or may be divided into one or more pieces and each piece may be moved to one of multiple physical storage locations.

Once a data set has been divided, the database system may implement fixed functionality to locate and retrieve the data stored in each of the multiple physical storage locations. For example, a database system may include two physical storage locations. The database system may choose to store data associated with the first row of the data set in the first physical storage location. The database system may further choose to store data associated with the second row of the data set in the second physical storage location. The database system may then choose to store data associated with the third row of the data set in the first physical storage location. Such a pattern may be repeated for each row of the dataset. The database system may then reverse such fixed functionality to locate and retrieve the data. For example, the database system may retrieve the data associated with the second row of the dataset by accessing the data stored on the second physical location.

If either the first or second physical storage location should also become filled to capacity, an additional physical storage location may be added to the database system. However, because the database system may utilize the fixed functionality to divide as well as retrieve data, all of the data stored on the first and second physical storage location may be required to be reshuffled to accommodate the addition of the third physical storage location.

For example, the database system may now choose to store data associated with the first row in the first physical storage location. The database system may further choose to store data associated with the second row in the second physical storage location. The database system may then choose to store data associated with the third row in the third physical storage location. Note that the data associated with the third row was previously stored in the first physical storage location. However, to adhere to fixed functionality that may be employed by the database system, the data associated with the third row may be required to be reshuffled to the third physical storage location.

Alternatively, if the database system does not employ fixed functionality to divide and store the dataset, the division and lookup functions may be required to change each time a new physical location is added to or removed from the database system. For example, the database system may include a non-fixed function that selects a physical location for a row in the dataset by performing a mathematical function based on the row number and the number of physical storage locations. Because the both the location of each row of data and the mathematical function determining the location of each row is based on the number of physical storage locations, both the mathematical function and the location of each row must be recalculated and reshuffled each time a physical storage location is added to or removed from the database system.

A system that implements a method that allows data to be easily moved from one physical storage location to another without requiring a reshuffling of all data on all physical storage locations each time a physical storage location is either added or removed may be useful.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides mechanisms and techniques for dynamic fragment mapping. A database object, such as a table, a rowset, index, or a partition of a table or index, may be divided into data fragments or may exist as a data fragment. A rowset may be considered to be a set of one or more rows in a database table or may be entries in an index. The terms row and record may be considered substantially identical. Therefore, a rowset may also be equivalent to a recordset.

A maximum number of possible data fragments may be chosen. As a dataset is divided into fragments, each piece of the dataset may be assigned a virtual identifier. A physical location that may contain a set of rows may be known as an actual fragment. An array may be created with each element including an identifier token that may be dereferenced to discover a physical location of an actual fragment. Such an array may act as a map for the purpose of discovering the physical location of an actual fragment from the virtual identifier. A mapping function that correlates the virtual identifier to a map index value may be called to discover the value of the element at the associated map index value. Each piece of the dataset may then be physically stored at the location referenced by the map index value.

Multiple elements in the map may refer to the same physical location. A new physical location may be added by changing the value at one of the multiple map index elements that point to a pre-existing physical location. The pieces of data that were previously associated with the map element may then be moved from the old physical location to the new physical location. Correspondingly, an existing physical location may be deleted by changing the value at a map index element to another pre-existing location and by moving the data from the location to be deleted to the said pre-existing location.

The set of elements comprising the actual fragment map may be expanded or contracted as necessary. For example, a circumstance may arise in which the map may no longer have enough storage for new physical locations. The number of map elements may then be increased by a chosen factor. As the mapping function may correlate a virtual identifier to map index values, a number of virtual identifier values may now correlate to a new map index value. The value of the map element at new index may be changed to reference a new physical location. All pieces of data associated with the new map index value may be moved to the new physical location.

In another example, a circumstance may arise in which a physical location stores too few rows. The number of map index elements may be reduced. As the mapping function correlates virtual identifiers to map index values, a number of virtual identifiers may now correlate to a new map index value. The value of the map index element may be changed to reference an existing physical location. All pieces of data associated with the new map index value may be moved to the existing physical location.

In an alternative example, the physical data associated with a virtual identifier may have grown too large for a physical location. Such a condition may be known as data skew. In such a data skew condition, it may not be possible to add a new physical location and assign a new physical address to the virtual identifier as doing so may move all information from the old physical location to the new location, instead of splitting the information into two parts. In such a data skew condition, a flag may be added to the map index entry and the data associated with the map index value may be distributed to all physical locations. Such a data skew flag may indicate that a lookup function may inspect all physical locations to discover the location of the data.

In order to find the physical location of a fragment, the virtual identifier is passed to the mapping function. The mapping function may then return the map index value. The element at the map index value may include an identifier referencing the physical location at which the fragment is stored. The identifier may then be dereferenced to discover the physical location and the fragment may be retrieved.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a dynamic fragment mapping system, the system described is provided as an example and not a limitation. As those skilled in the art will appreciate, the present examples are suitable for application in a variety of different types of dynamic fragment mapping systems.

Figure 1:
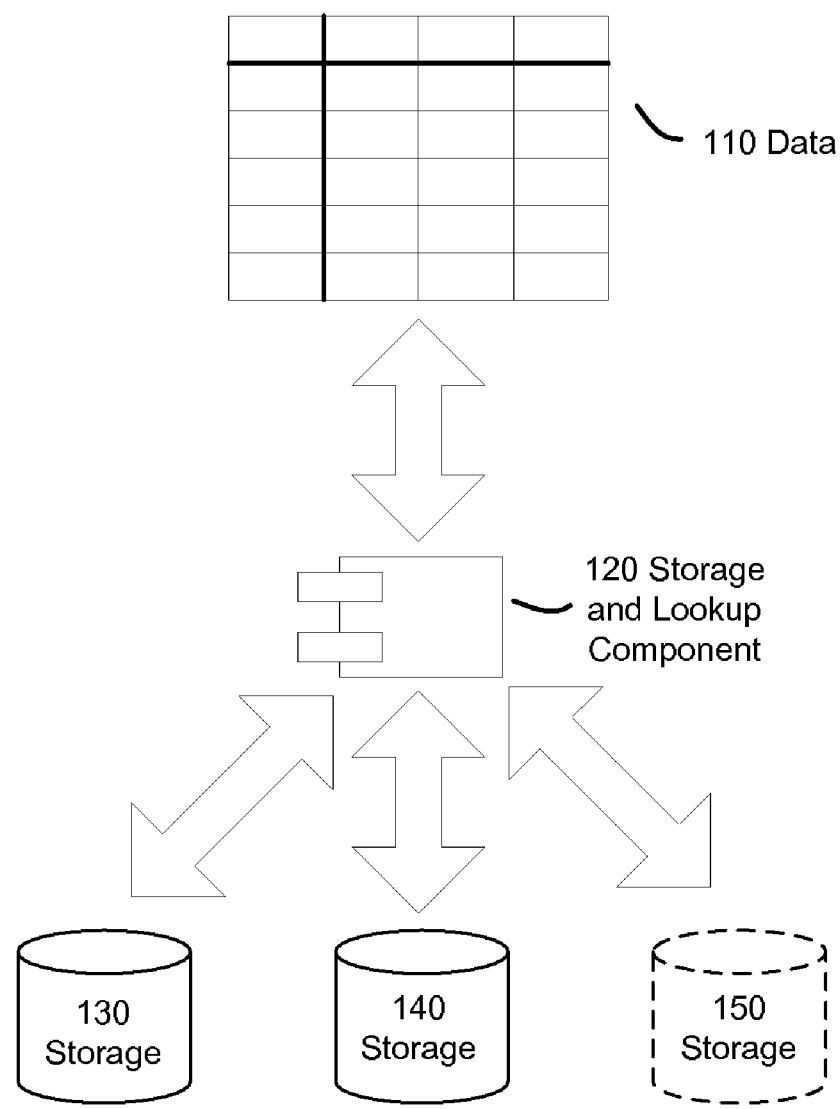
FIG. 1 is a block diagram showing a conventional data storage and lookup system.

FIG. 1 is a block diagram showing a conventional data lookup system 100 including a conventional dataset 110, a conventional storage and lookup component 120, conventional physical storage 130, conventional physical storage 140, and conventional physical storage 150.

The conventional data lookup system 100 may be any type of typical database system including a standalone database system such as Microsoft® SQL Server™, a database system incorporated into a managed or interpreted language system such as Microsoft® .Net, Sun Microsystems Java, or the like. The conventional dataset 110 may be coupled to the conventional storage and lookup component 120. The conventional storage and lookup component 120 may be coupled to conventional physical storage 130, conventional physical storage 140, and conventional physical storage 150. Each of conventional physical storage 130, conventional physical storage 140, or conventional physical storage 150 may be a typical form of computer storage such as volatile or non-volatile physical memory, a computer hard disk drive, or the like.

The conventional dataset 110 may be any type of data stored in a tabular structure. For example, the conventional dataset 110 may be a conventional database table having conventional rows and conventional columns, extensible markup language (XML), or the like. The conventional storage and lookup component 120 may be a typically constructed software component capable of executing on the conventional data lookup system 100. The conventional storage and lookup component 120 may implement a conventional storage function. Such a conventional storage function may provide functionality to store one or more rows of the conventional dataset 110 in one of conventional physical storage 130, conventional physical storage 140, or conventional physical storage 150. Such a conventional storage function may further implement fixed functionality to determine which of conventional physical storage 130, conventional physical storage 140, or conventional physical storage 150 a row may be stored in.

The conventional storage and lookup component 120 may further implement a conventional fixed lookup function. Such a conventional fixed lookup function may provide functionality to discover the location of the one or more rows of the conventional dataset 110 stored in conventional physical storage 130, conventional physical storage 140, or conventional physical storage 150. Such a conventional fixed lookup function may further make use of the fixed functionality used by the conventional storage function to discover the location of one or more rows of the conventional dataset 110.

For example, the conventional storage function may utilize the count of physical storage units to determine where to store the one or more rows of the conventional dataset 110. In one example, the conventional storage and lookup component 120 may initially be coupled to conventional physical storage 130 and conventional physical storage 140. The conventional storage function may store odd-numbered rows in conventional physical storage 130 and even-numbered rows in conventional physical storage 140. The conventional lookup function may therefore locate the data associated with an odd-numbered row in conventional physical storage 130 and data associated with an even-numbered row in conventional physical storage 140.

Continuing the example, the conventional storage and lookup component 120 may then add conventional physical storage 150 in response to either of conventional physical storage 130 or conventional physical storage 140 becoming filled to capacity. However, the conventional storage and lookup component 120 may not simply migrate rows stored at conventional physical storage 130 or conventional physical storage 140 to conventional physical storage 150. As discussed previously, the conventional lookup function may expect to find odd-numbered rows in conventional physical storage 130 and even-numbered rows in conventional physical storage 150. Therefore, the conventional lookup function may extend the fixed functionality such that a first row of the conventional dataset 110 may be stored in conventional physical storage 130, a second row may be stored in conventional physical storage 140, a third row may be stored in conventional physical storage 150, a fourth row may be stored in conventional physical storage 130, and so on, repeating such a pattern.

As can be seen from the above example, the addition of conventional physical storage 150 may require a complete reshuffling of the data that was previously stored on conventional physical storage 130 and conventional physical storage 140. Alternatively, conventional storage and lookup component 120 may be replaced with an alternative conventional storage and lookup component including a new conventional storage method and new conventional lookup method. Such a new conventional storage method and new conventional lookup method may include functionality to store and retrieve data from each of conventional physical storage 130, conventional physical storage 140, or conventional physical storage 150. However, if an additional conventional physical storage location should be introduced, an additional new conventional storage and lookup component may also be required to replace the previous conventional storage and lookup component.

A system that implements a method that allows data to be easily moved from one physical storage location to another without requiring a reshuffling of all data on all physical storage locations each time a physical storage location is either added or removed may be useful.

Figure 2:
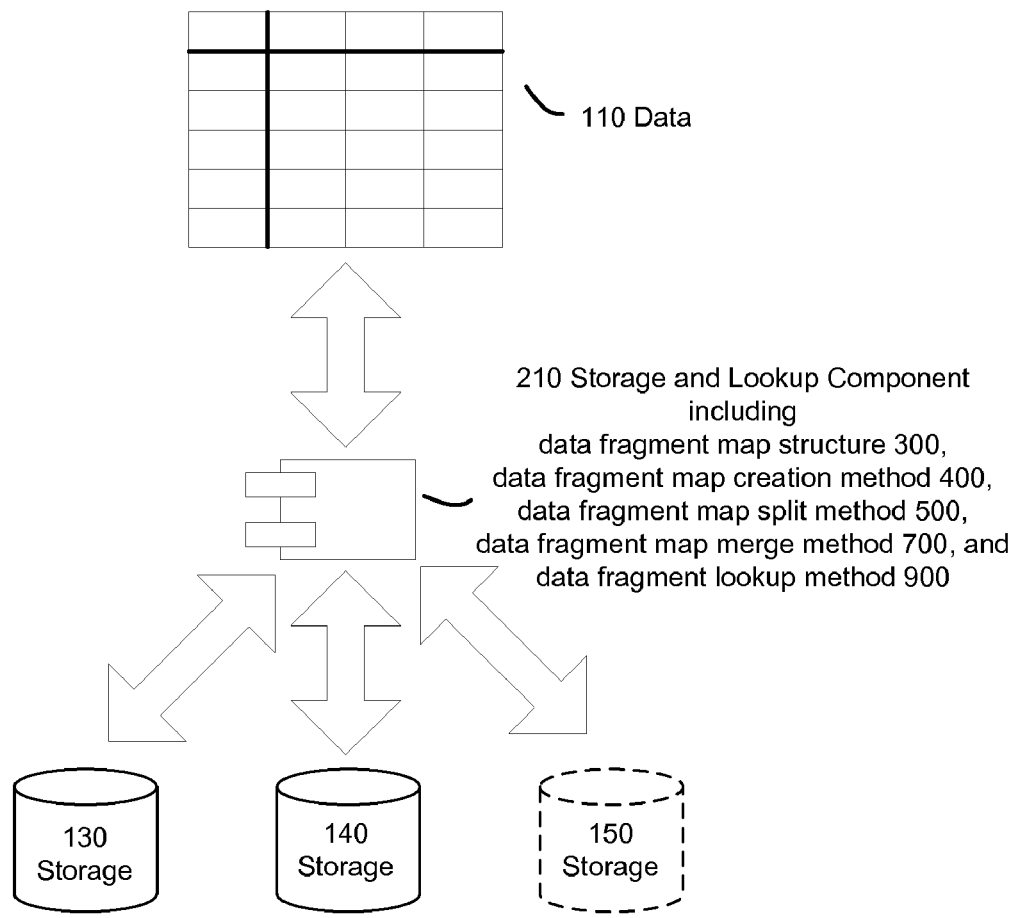
FIG. 2 is a block diagram showing a dynamic fragment system including an example method for creating a fragment map, an example method for splitting an actual fragment, an example method for merging an actual fragment, and an example method for looking up the location of a fragment.

FIG. 2 is a block diagram showing a dynamic fragment system 200 including an example lookup component 210 including an example method for creating a fragment map 400, an example method for splitting an actual fragment 500, an example method for merging an actual fragment 700, and an example method for looking up the location of a fragment 900.

The dynamic fragment system 200 may be any type of typical database system including a standalone database system such as Microsoft® SQL Server™, a database system incorporated into a managed or interpreted language system such as Microsoft® .Net or Sun Microsystems Java, or the like. However, the dynamic fragment system 200 may be used in any type of computer system to provide the functionality described herein. Those skilled in the art will realize that the dynamic fragment system 200 includes functionality which may be used in a broad range of applications where a first identifier may be mapped to a second identifier. A fragment may also be known as a subset of a dataset.

The dataset 110 may be coupled to the storage and lookup component 210. The storage and lookup component 210 may be coupled to physical storage location 130, physical storage location 140, and physical storage location 150. The dataset 110 may be any type of data stored in a tabular structure. For example, the dataset 110 may be a conventional database table having conventional rows and conventional columns. A conventional column of the dataset 110 may be designated to include a unique identifier or unique key.

The storage and lookup component 210 may be a typically constructed software component capable of executing on the dynamic fragment system 200. Each of physical storage location 130, physical storage location 140, or physical storage location 150 may be a typical form of computer storage such as volatile or non-volatile physical memory, a computer hard disk drive, or the like.

The storage and lookup component 210 may further implement an example method for creating a fragment map 400, an example method for splitting an actual fragment 500, an example method for merging an actual fragment 700, an example method for looking up the location of a fragment 900, and the like. The method for creating a fragment map 400 will be discussed more fully in the description of FIG. 4. The method for splitting an actual fragment 500 will be discussed more fully in the description of FIG. 5. The method for merging an actual fragment 700 will be discussed more fully in the description of FIG. 7. The method for looking up the location of a fragment 900 will be discussed more fully in the description of FIG. 9.

Figure 3:
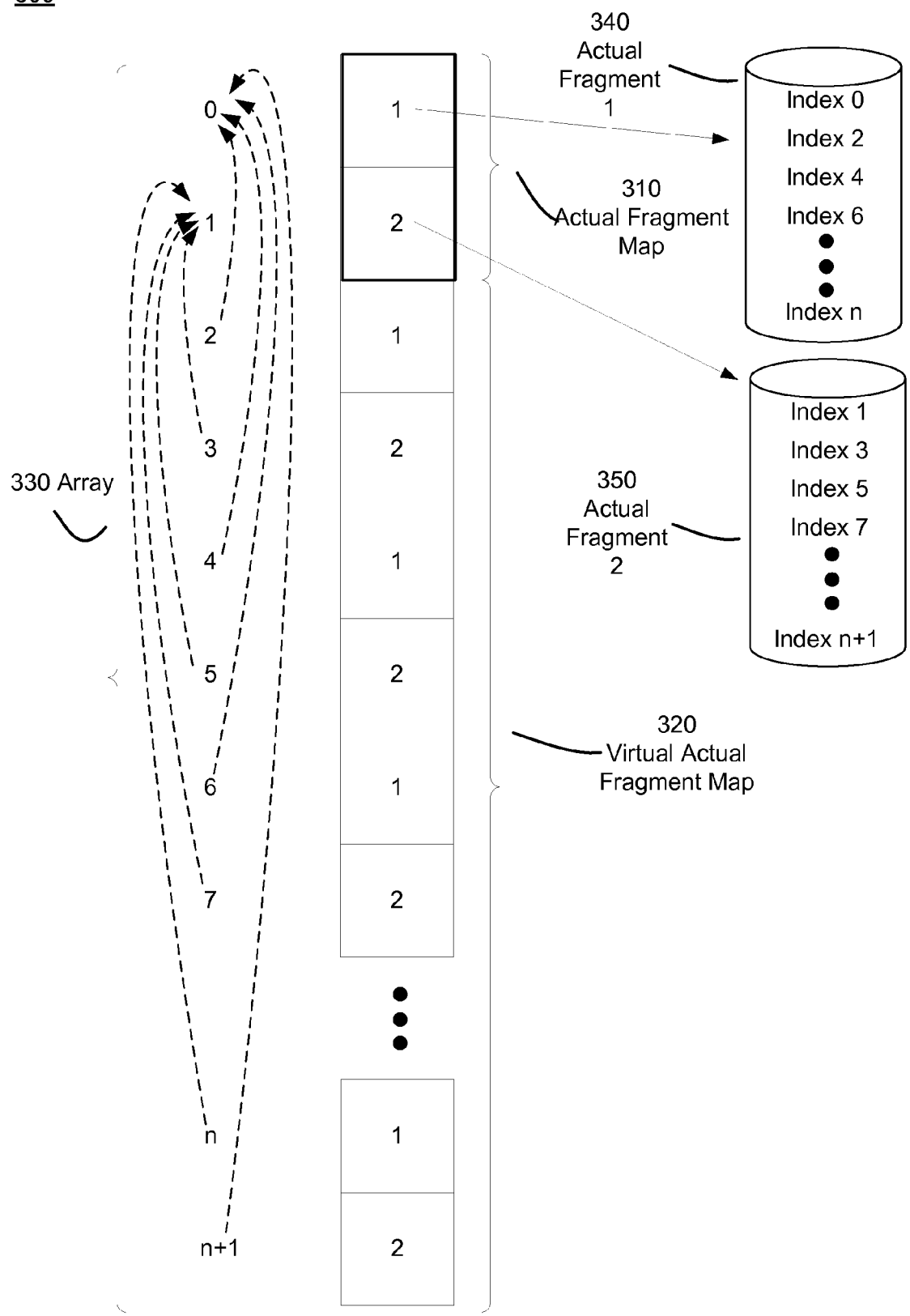
FIG. 3 is a block diagram showing a fragment mapping data structure.

FIG. 3 is a block diagram showing a fragment mapping data structure 300. fragment mapping data structure 300 The fragment mapping data structure 300 fragment mapping data structure 300 may be a typical computer data structure in the form of an array, a list, a collection, or any other grouping of homogenous elements of a specific data type.

The fragment mapping data structure 300 may be comprised of a map 330 which may include a set of elements indexed by number which is also the logical fragment id. The map 330 may further be comprised of an actual fragment map 310 and a virtual actual fragment map 320. The actual fragment map 310 may be comprised of any number of elements of the map 330. Further, each element of the actual fragment map 310 may include an identifier, a token, or the like, which may reference an actual fragment such as a first actual fragment 340 and/or a second actual fragment 350. In an alternative example, each element of the actual fragment map 310 may reference an index into another similar fragment map structure.

As discussed previously, each element in the map 330 may be indexed by number, as represented in FIG. 3 by the numbers 0 through n+1. Further, elements in the map 330 included in the virtual actual fragment map 320 may have an index value that, when passed through a function, such a function may return an index value falling within the actual fragment map 310. In this manner, index values of elements in virtual actual fragment map 320 are "mapped" using the function to corresponding elements in the actual fragment map 310. Such a function will be described more fully in the description of FIG. 4, FIG. 5, FIG. 7, and FIG. 9.

Further, as the elements in the actual fragment map 310 may include an identifier corresponding to an actual fragment 340, a second actual fragment 350, or the like, the elements in virtual actual fragment map 320 thereby "point" to one of actual fragment 340 or second actual fragment 350. Such a relationship is illustrated by the inclusion of index values 0, 2, 4, 6 through n in actual fragment 340 and index values 1, 3, 5, 7, and n+1 in second actual fragment 350.

In one embodiment, the fragment mapping data structure 300 actual fragment map 310 may be used to map rows in a dataset to physical storage locations. In an alternative embodiment, the actual fragment map 310 fragment mapping data structure 300 may be used to map any indexed data to any corresponding fragment type. In another alternative embodiment, the actual fragment map 310 may be used to map virtual identifiers to actual identifiers in another fragment map structure. An example method for creating an example embodiment of a fragment map structure may now be discussed.

Figure 4:
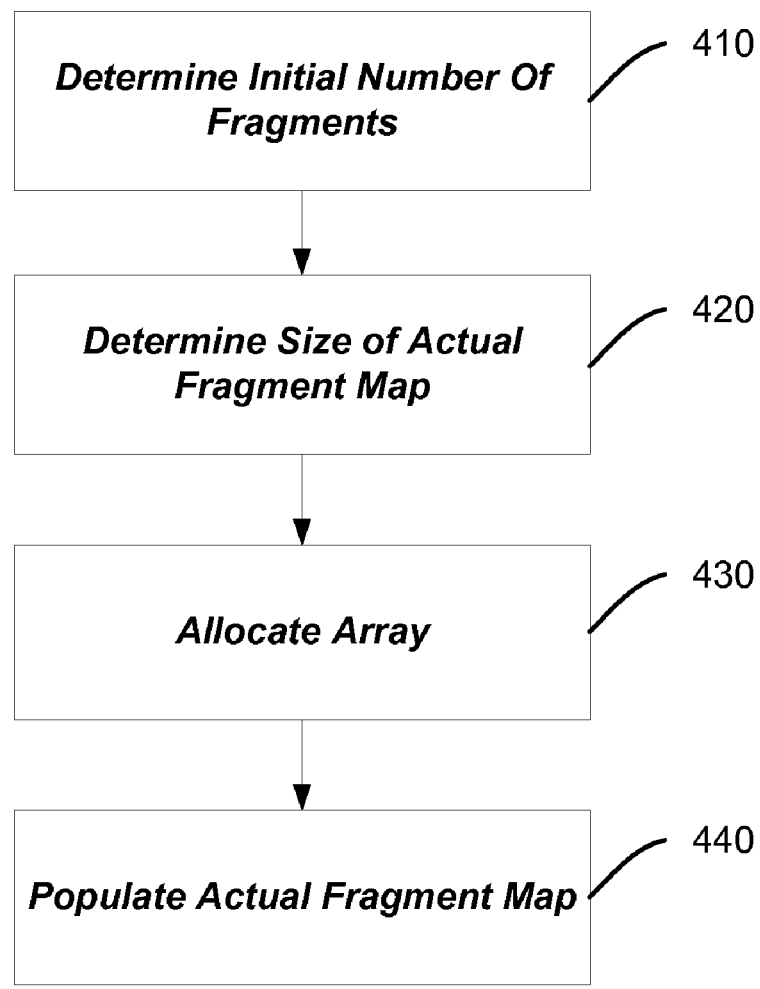
FIG. 4 is a flow diagram showing an example method for creating a fragment map.

FIG. 4 is a flow diagram showing an example method for creating a fragment map 400.

Block 410 may refer to operation in which an initial number of fragments may be determined. Any method may be used to determine an initial number of fragments. In one embodiment, the initial number of fragments may be determined to be a power of 2. In an alternative example, the initial number of fragments may be determined to be a factor of the size of the actual fragment map. In another alternative example, the initial number of fragments may be related to the size of a dataset represented by the initial number of fragments.

Block 420 may refer to an operation in which the size of an actual fragment map may be determined. An actual fragment map may include an identifier, token, or the like representing a physical storage location of an actual fragment, physical fragment, virtual fragment, or the like. Such a determination may be performed using any method. In one embodiment, the size of the actual fragment map is determined based on the size of the initial number of fragments determined at block 410. If the determination does not result in an actual map size that is a power of two, the next closest power of two may be selected.

Block 430 may refer to an operation in which an array having index values and elements may be created. An array may be created that is the size of the actual fragment map determined at block 420. In an alternative embodiment, an array may be created that may be equivalent to the size of the initial fragment map created at block 410 and the size of the actual fragment map created at block 420 combined. In an alternative embodiment, an array either greater or lesser in size than the combination of the size of the initial fragment map created at block 410 and the size of the actual fragment map created at block 420 may be created and dynamically adjusted to another size.

Block 440 may refer to an operation in which the elements of the actual fragment map as determined in block 420 may be populated with values. Values may be chosen using any method and such values may be identifiers, tokens, or the like. In one embodiment, these values are reference to physical locations of actual fragments. Such values may be inserted into the actual fragment map using any method.

Figure 5:
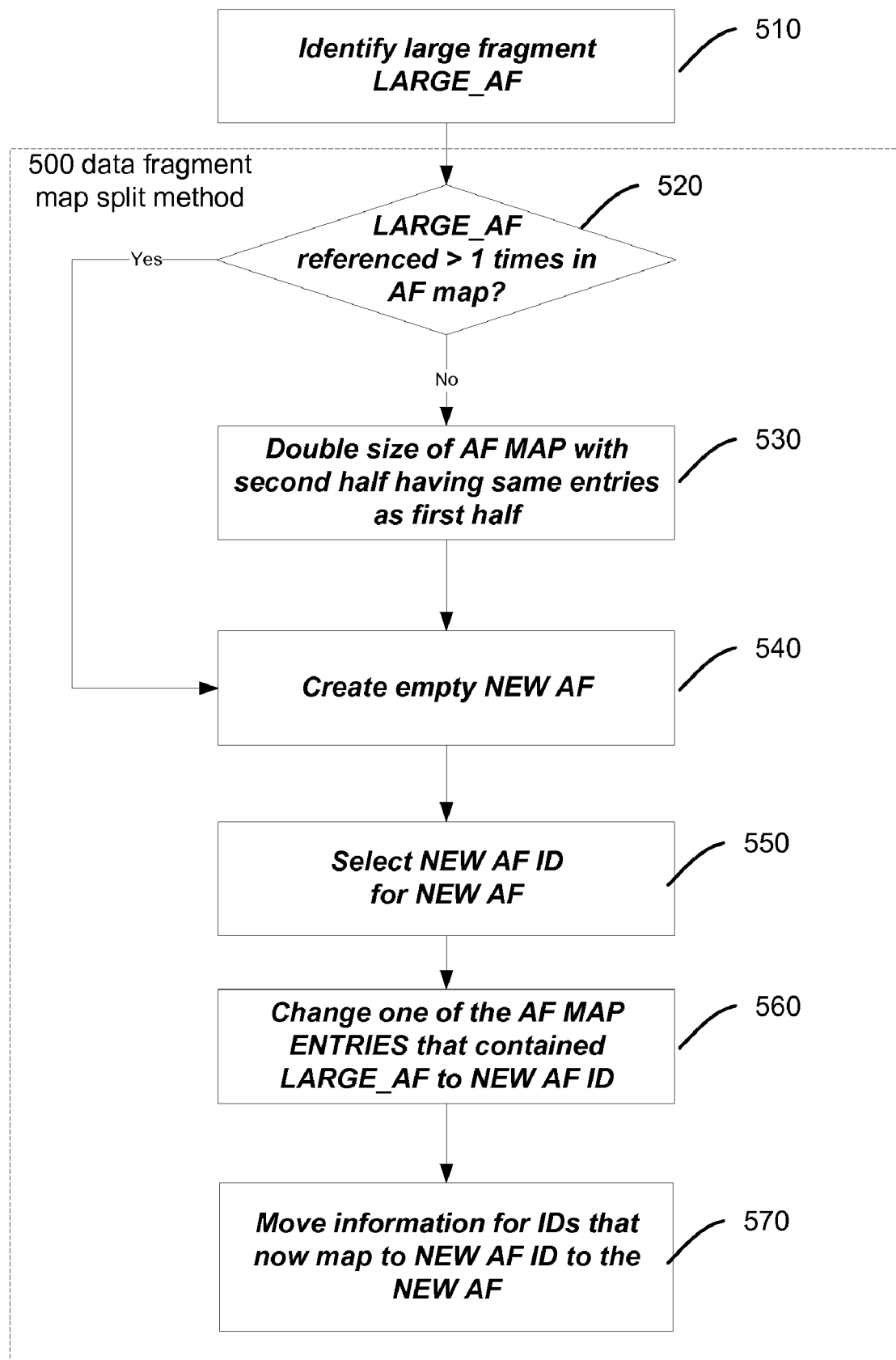
FIG. 5 is a flow diagram showing an example method for splitting an actual fragment.

FIG. 5 is a flow diagram showing an example method for splitting an actual fragment 500. A fragment map may be an array such as that discussed in FIG. 3.

Block 510 may refer to an operation in which a fragment that has grown too large is identified. Such identification may take the form of querying the fragment and making a further determination that the fragment may be full to capacity or larger than the desired size and may not store any additional information. For the purposes of demonstration, LARGE_AF may refer to the fragment which has grown too large.

Block 520 may refer to decision in which it is determined if LARGE_AF is referenced more than one times in the actual fragment map. In response to a negative determination, flow continues to block 530. In response to a positive determination, flow continues to block 540.

Block 530 may refer to an operation in which the size of the actual fragment map is doubled. However, as will be appreciated by those skilled in the art, the actual fragment map may be increased in size by any appropriate factor. Subsequent to doubling the size of the actual fragment map, the values of the elements in the original actual fragment map are copied to the newly created elements of the actual fragment map.

Block 540 may refer to an operation in which a new actual fragment is created. Such an actual fragment may be "empty", may not contain any information, or the like. Such a new actual fragment may be referred to by NEW AF for the purposes of discussion.

Block 550 may refer to an operation in which a new identifier is selected or created for the actual fragment created in block 540. Such an identifier may be a numeral, a token, any value, or the like. Such a new identifier may be referred to by NEW AF ID for the purposes of discussion.

Block 560 may refer to an operation in which one of the entries in the actual fragment map that was once populated with the identifier LARGE_AF may be changed to the NEW AF ID selected or created at block 550.

Block 570 may refer to an operation in which data rows associated with IDs in the virtual actual fragment map of the array which now point to the NEW AF ID may be moved from the LARGE_AF fragment to the NEW AF. Such a moving of information may be accomplished using any means. For example, the information may be copied from one physical storage device to another, may be copied over a network, may be copied from one area of physical memory to another area of physical memory, or the like.

The following figure may utilize a series of diagrams to illustrate the method of FIG. 5.

Figure 6:
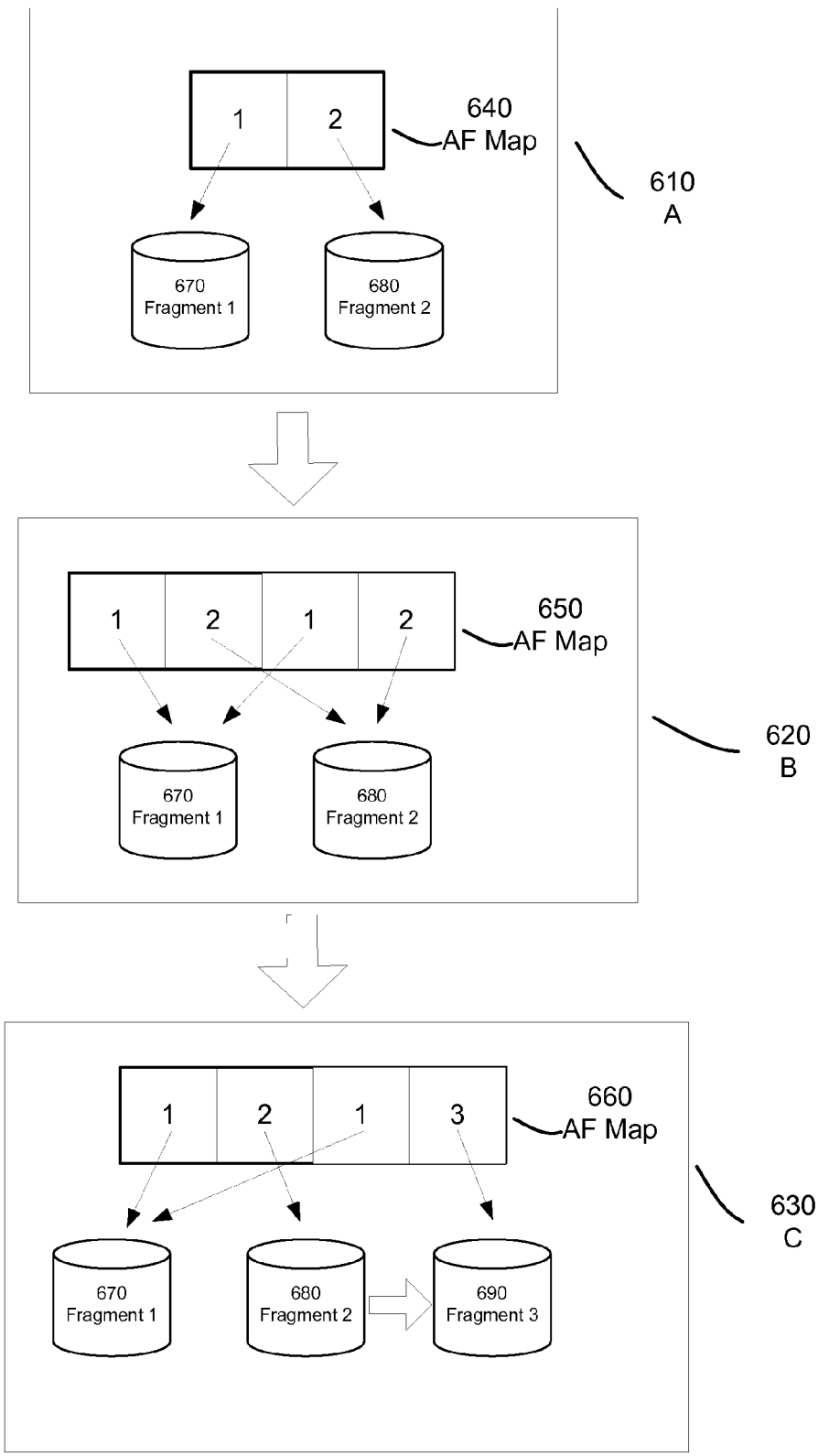
FIG. 6 is a block diagram showing state transitions in an example fragment map and example physical locations during actual fragment splitting.

FIG. 6 is a block diagram showing state transitions in an example fragment map and example physical locations during actual fragment splitting 600.

Block A 610 may refer to a state in which the actual fragment map 640 includes two elements. A first element of the actual fragment map 640 may include an identifier corresponding to a first actual fragment 670. A second element of the actual fragment map 640 may include an identifier corresponding to a second actual fragment 680. In Block A 610, the second actual fragment 680 may have become filled to capacity. Note that the information included in first actual fragment 670 may be mapped to the first element of actual fragment map 640 using a mapping function as discussed earlier. Further, information included in the second actual fragment 680 may also be mapped to the second element of the actual fragment map 640 using a mapping function also as discussed earlier. Such a mapping may be represented by the arrows in Block A 610.

Block B 620 may refer to a state in which the actual fragment map 640 has been doubled in size to create the expanded actual fragment map 650. The identifiers included in the first and second elements of actual fragment map 640 may have been copied into the newly created elements of expanded actual fragment map 650. As can be seen in Block B 620, the first and third elements of the expanded actual fragment map 650 may correspond to the first actual fragment 670. Further, the second and fourth elements of the expanded actual fragment map 650 may correspond to the second actual fragment 680.

Note that the mapping function that may map elements of a virtual actual fragment associated with the expanded actual fragment map 650 to the first actual fragment 670 and the second and fourth elements of the expanded actual fragment map 650 to the second actual fragment 680 may be a modulus function. For example, the modulus function may return the remainder after dividing the size of the expanded actual fragment map 650 by the index number of an element within the expanded actual fragment map 650 or any other portion of elements beyond the index values of expanded actual fragment map 650 such as a virtual actual fragment map. However, any type of hashing or mapping function which produces such behavior may be used.

Block C 630 may refer to a state in which a third actual fragment 690 may have been added. The fourth entry in the expanded actual fragment map 650 may have been modified to create the final expanded actual fragment map 660. The fourth element of the final expanded actual fragment map 660 may now correspond to the third actual fragment 690. That is, because the mapping function discussed earlier may map elements in the virtual actual fragment map to either of the second or fourth elements in the final expanded actual fragment map 660, the elements in the virtual actual fragment map that may have corresponded to the second entry may now correspond to the fourth entry. Thereby, these elements may now correspond to the new fragment, the third actual fragment 690. Finally, any information stored on the second actual fragment 680 that now maps to the fourth element in final expanded actual fragment map 660 is moved to third actual fragment 690.

Figure 7:
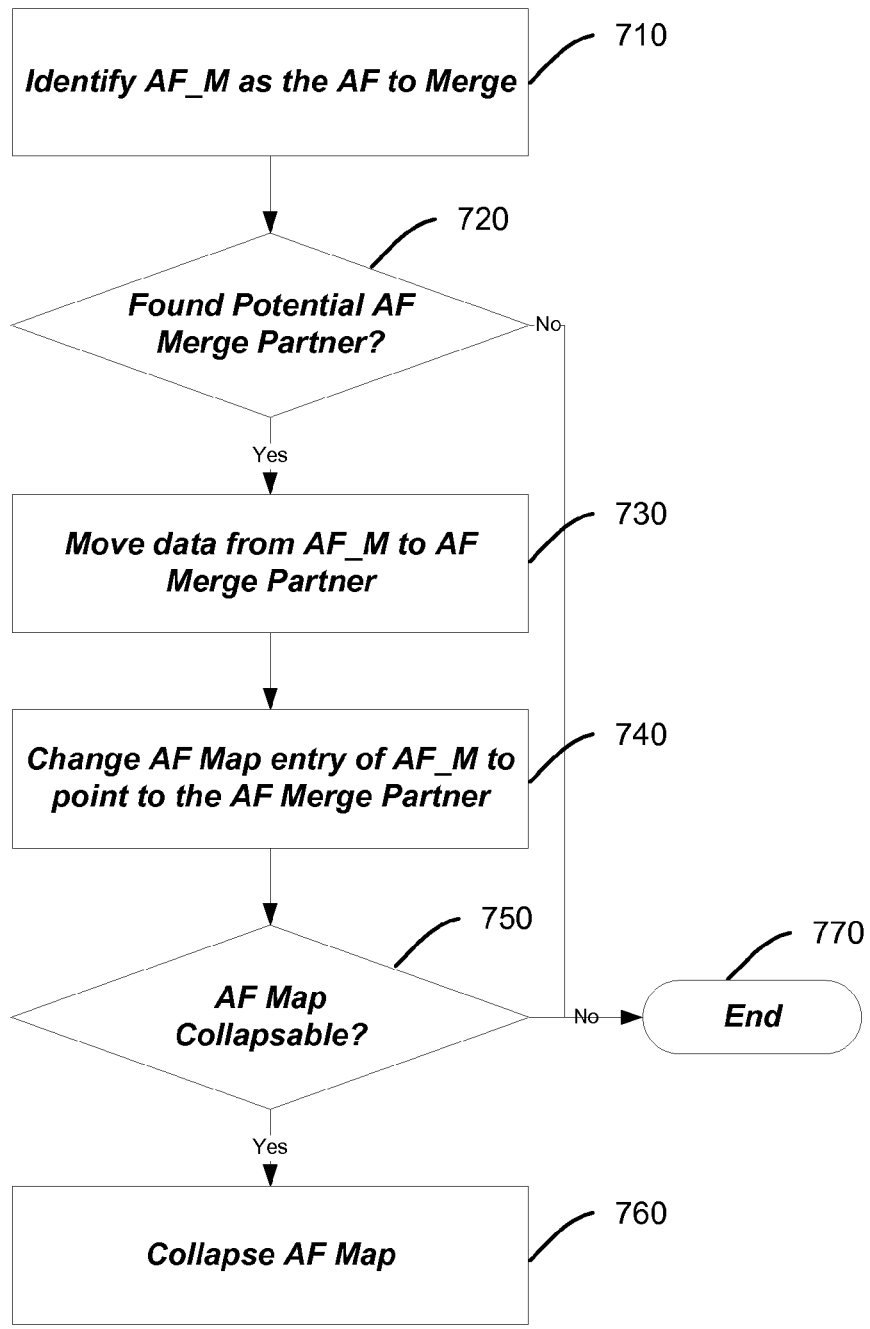
FIG. 7 is a flow diagram showing an example method for merging an actual fragment.

FIG. 7 is a flow diagram showing an example method for merging an actual fragment 700.

Block 710 may refer to an operation in which an actual fragment is identified as a candidate to be merged. Such identification may take the form of querying the actual fragment and making a further determination that the fragment may have a large amount of free or empty storage space. Such a candidate actual fragment may be referred to as AF_M for the purposes of discussion. AF_M ID may refer to the identifier associated with the identified fragment.

Block 720 may refer to a determination in which the actual fragment map is queried to determine if the actual fragment map includes a potential merge partner for the candidate actual fragment AF_M. In one embodiment, elements in the actual fragment map having similar factors like free storage space are queried to determine if one of the actual fragments is a potential merge partner for the candidate actual fragment AF_M. However, any element within the actual fragment map may be a potential merge partner for the candidate actual fragment AF_M. In response to a negative determination, flow continues to block 770. In response to a positive determination, the potential merge partner actual fragment becomes the merge partner actual fragment and flow continues to block 730.

Block 730 may refer to an operation in which any information stored on the actual fragment AF_M is moved to the merge partner actual fragment that may have been identified at block 720.

Block 740 may refer to an operation in which the map entry in the actual fragment map that formerly included a reference to the candidate actual fragment AF_M is modified to include a reference to the identifier of the merge partner actual fragment that may have been identified at block 720.

Block 750 may refer to a determination in which is determined if the actual fragment map may be collapsed, or reduced in size. In one embodiment, the actual fragment map is inspected and if the elements of the actual fragment map include identifiers forming a regular pattern, the actual fragment map may be collapsed by a factor related to the number of times the pattern may repeat. For example, the actual fragment map may include four elements, with the first and third elements including a first identifier and the second and fourth elements including a second identifier. The actual fragment map may be collapsed because the identifiers follow a repeated pattern of first identifier, second identifier. In response to a negative determination, flow continues to block 770. In response to a positive determination, flow continues to block 760.

Block 770 may refer to an operation in which the method may be terminated.

Block 760 may refer an operation in which the actual fragment map is collapsed. Such collapsing may be performed using any method. In one embodiment, the actual fragment map may be collapsed by reducing the number of elements included in the actual fragment map. The following figure may utilize a series of diagrams to illustrate the method of FIG. 7.

Figure 8:
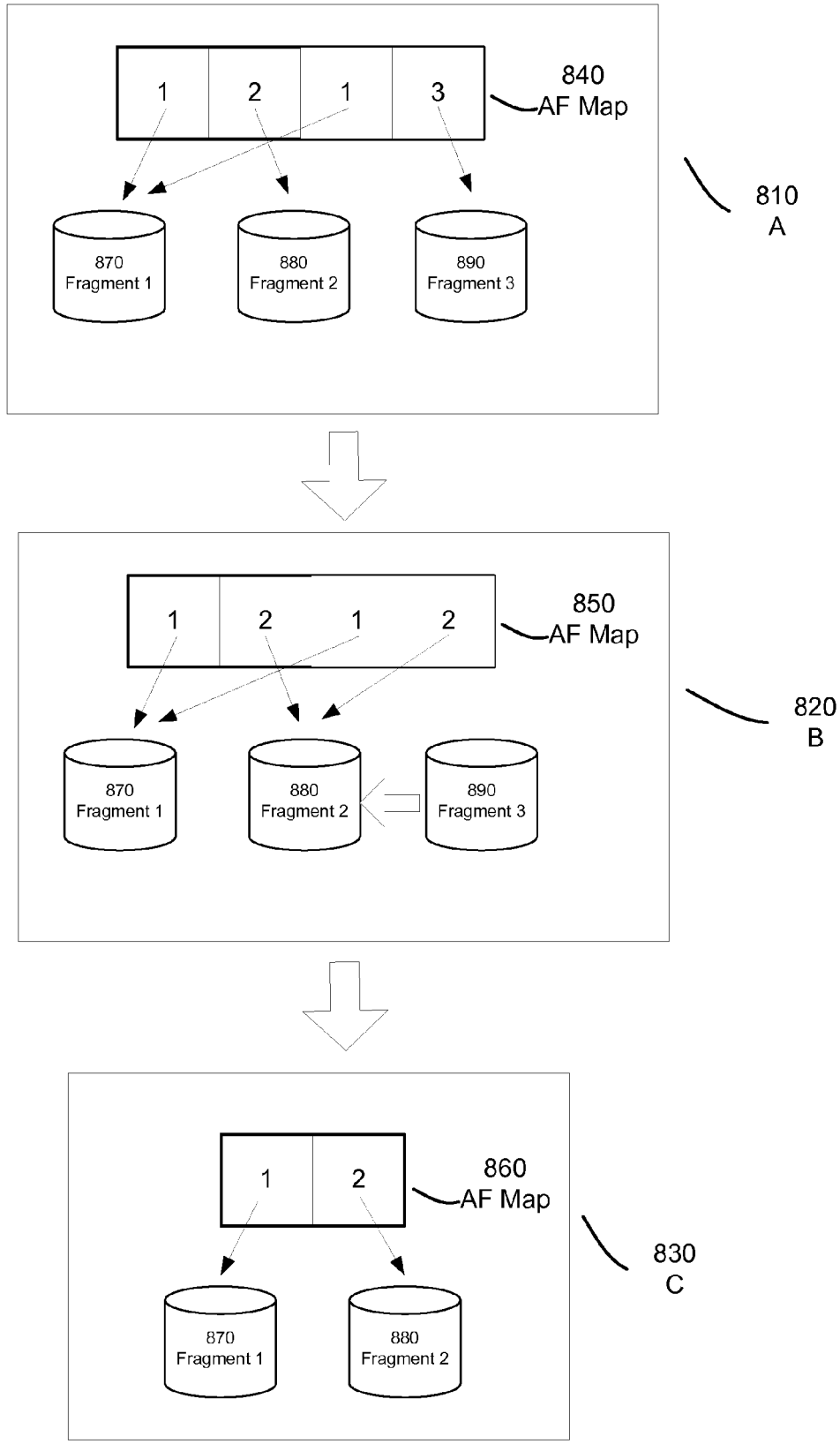
FIG. 8 is a block diagram showing state transitions in an example fragment map and example physical locations during actual fragment merging.

FIG. 8 is a block diagram showing state transitions in an example fragment map and example physical locations during actual fragment merging 800.

Block A 810 may refer to a state in which the actual fragment map 840 includes four elements. A first element of the actual fragment map 840 may include an identifier corresponding to a first actual fragment 870. A second element of the actual fragment map 840 may include an identifier corresponding to a second actual fragment 880. A third element of the actual fragment map 840 may include an identifier corresponding to the first actual fragment 870. Finally, a fourth element of the actual fragment map 840 may include an identifier corresponding to a third actual fragment 890.

In Block A 810, the third actual fragment 890 may store less than a certain minimum amount of data. Note that the information included in third actual fragment 890 may be referenced by the fourth element of actual fragment map 840. Such references may be represented by the arrows in Block A 810. Elements in an associated virtual actual fragment map are not shown, but such elements in a virtual actual fragment map may be associated with one of the elements in actual fragment map 840 using a mapping function as described earlier. Such a mapping function may be a modulus function utilizing the size of the actual fragment map 840 to determine a remainder.

Block B 820 may refer to state in which the fourth element of the modified actual fragment map 850 has been changed to include an identifier corresponding to second actual fragment 880. In addition, the information stored on third actual fragment 890 may be moved to second actual fragment 880.

Block C 830 may refer to a state in which the modified actual fragment map 850 of Block B 820 may be collapsed to produce the collapsed actual fragment map 860. Note that elements in an associated virtual actual fragment map may have been previously mapped to the third and fourth elements of the actual fragment map using a mapping function. Because such a mapping function may be a modulus function utilizing the size of the collapsed actual fragment map 860, elements in an associated virtual actual fragment map may now map to either the fist or second element of collapsed actual fragment map 860.

Figure 9:
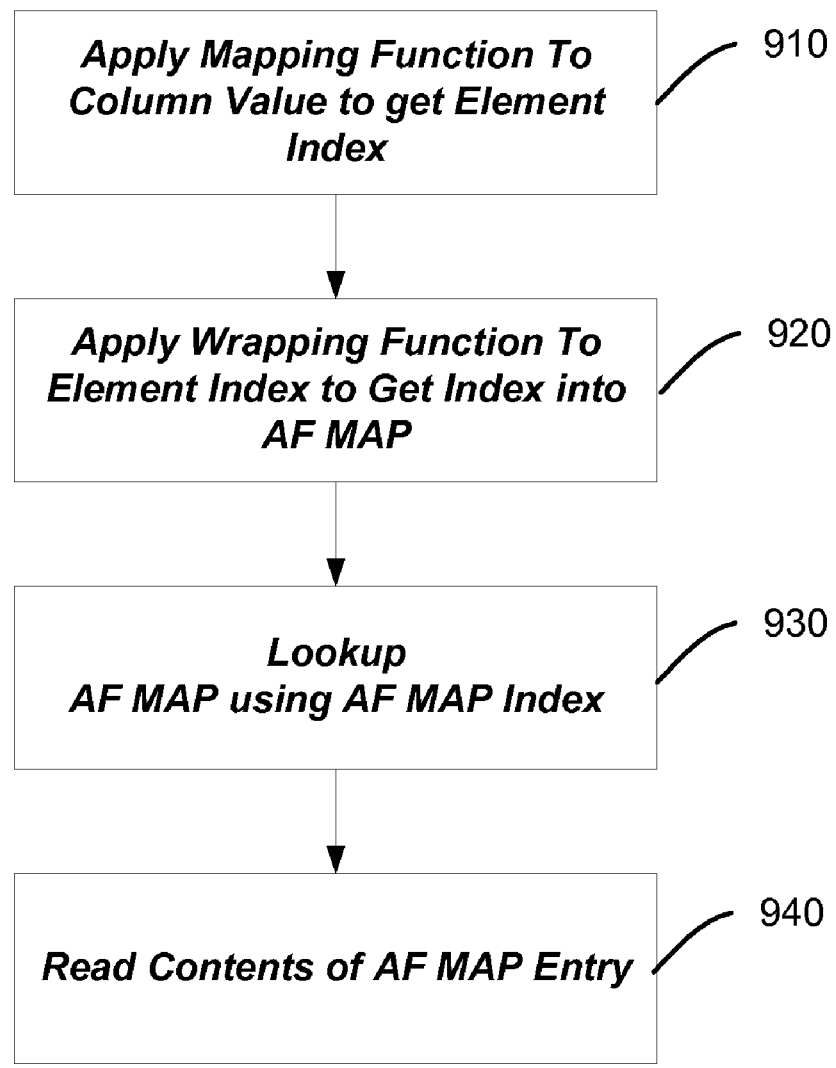
FIG. 9 is a flow diagram showing an example method for looking up an identifier of a physical location of a fragment using a fragment identifier.

FIG. 9 is a flow diagram showing an example method for looking up the location of a fragment 900.

Block 910 may refer to an operation in which a hashing function may used to map a row in a data set to an element that may be included in a virtual actual fragment map. In one embodiment, the hashing function may take a column value of a row in the data set as a parameter and return an element index value of a virtual actual fragment map. However, any hash function that may map a piece of information to an index in the virtual actual fragment map may be used.

Block 920 may refer to an operation in which a wrapping, or mapping, function may be used to discover the corresponding element in the actual fragment map to which the element index determined at block 910 may be mapped. In one embodiment, the wrapping function may be a modulus function that may return the actual fragment map index by dividing the element index determined at block 910 by the size of the actual fragment map and returning the remainder. However, any wrapping function that maps an element index in the virtual actual fragment map to an element index in the actual fragment map may be used.

Block 930 may refer to an operation in which the element index in the actual fragment map determined at block 920 is located.

Block 940 may refer to an operation in which an identifier that may be stored at the element index in the actual fragment map that may have been located at block 930 is read. Such a reading operation may be performed using any typical array data reading operation.

Figure 10:
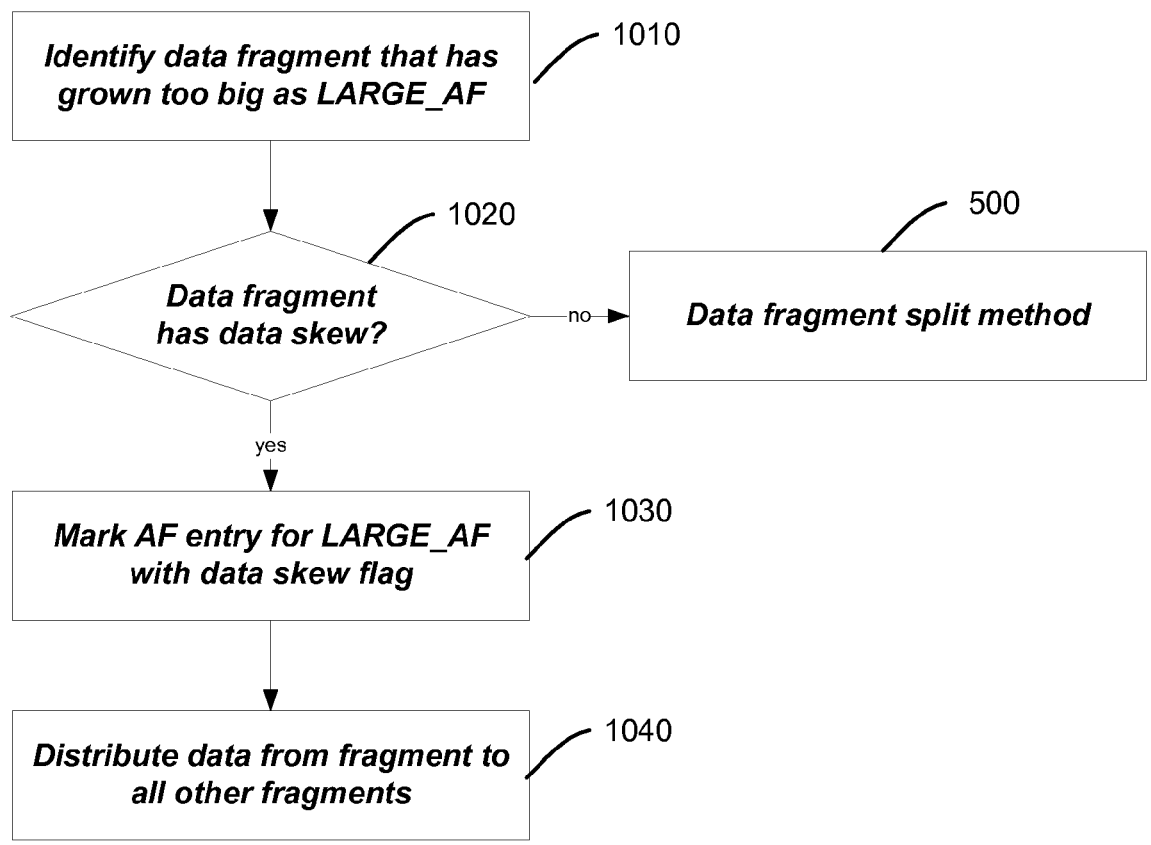
FIG. 10 is a flow diagram showing an example method for splitting an actual fragment and for marking a fragment as having data skew in a fragment map.

FIG. 10 is a flow diagram showing an example method for splitting an actual fragment and for marking a fragment as having data skew in a fragment map 1000.

Block 1010 may refer to an operation in which a fragment that has grown too large is identified. Such identification may take the form of querying the fragment and making a further determination that the fragment may be full to capacity or larger than the desired size and may not store any additional information. LARGE_AF may refer to the fragment that has grown too large for the purposes of discussion.

Block 1020 may refer to a decision to determine whether the fragment identified at block 1010 is in a condition of data skew. Data skew may refer to a condition in which a number of rows of data exceeding a predetermined threshold may map to a single fragment. Furthermore, the fragment map may be in such a condition that the fragment may no longer be split as described in the discussion of FIG. 5. In response to a negative determination, flow continues on to block 500 of FIG. 5. In response to a positive determination, flow continues on to block 1030.

Block 1030 may refer to an operation in which the element index to which the fragment identified at block 1010 may have had a data skew flag added to designate that the fragment is in a condition of data skew. Such a flag may be any type of data or information. For example, the data skew flag may be an additional portion of data stored with any information already stored at the actual fragment LARGE_AF identified at block 1010.

Block 1040 may refer to an operation in which the information or data that was previously stored on the fragment identified at block 1010 LARGE_AF is distributed to all other fragments. Such a distribution may be performed using any method. For example, the information or data stored on LARGE_AF may be copied to local physical storage represented by all other fragments, may be copied over a network connection to other physical storage represented by all other fragments, or the like.

Figure 11:
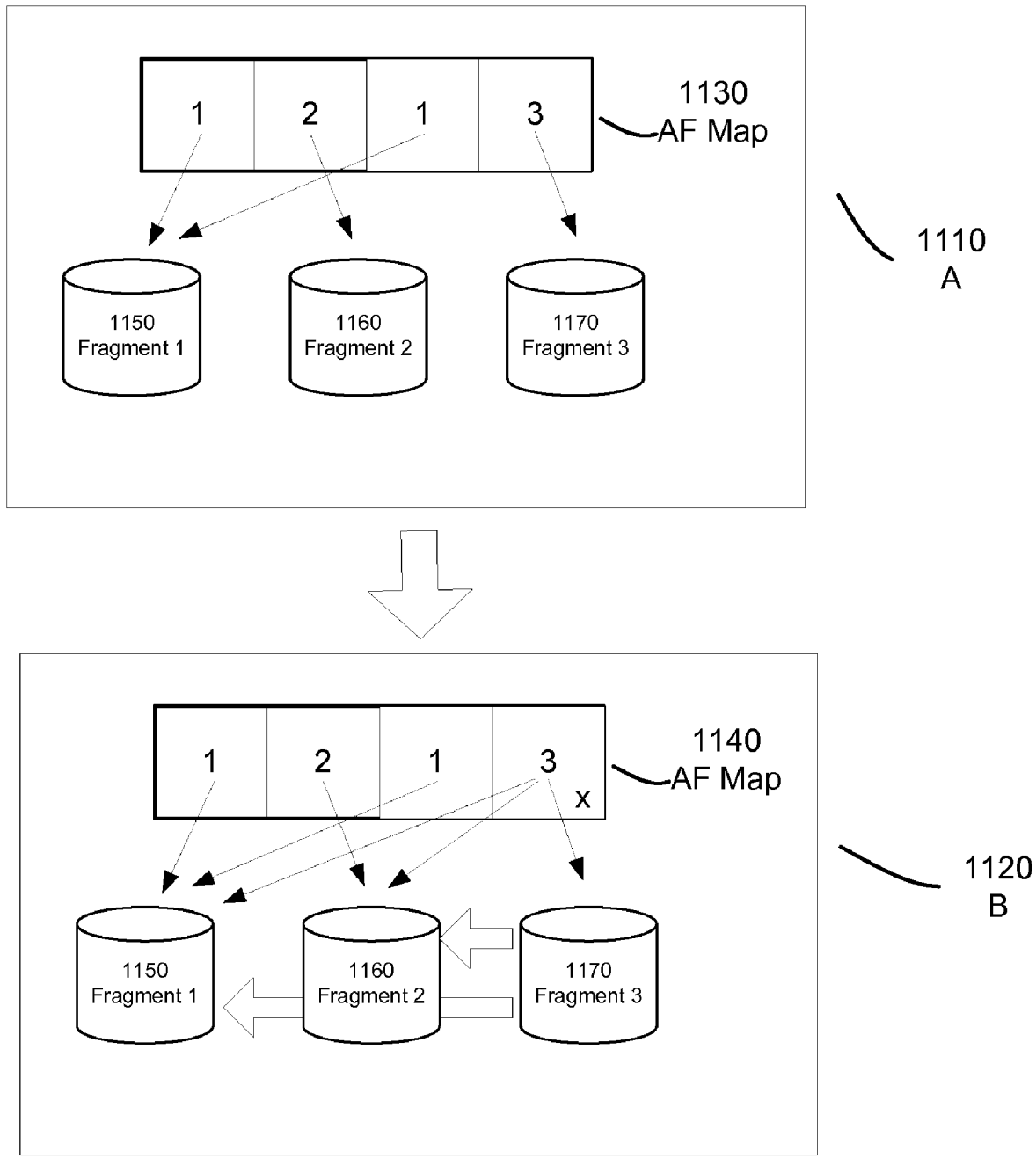
FIG. 11 is a block diagram showing state transitions in an example fragment map and example physical locations during actual fragment splitting including data skew.

FIG. 11 is a block diagram showing state transitions in an example fragment map and example physical locations during actual fragment splitting including data skew 1100.

Block A 1110 may refer to a state in which the actual fragment map 1130 includes four elements. A first element of the actual fragment map 1130 may include an identifier corresponding to a first actual fragment 1150. A second element of the actual fragment map 1130 may include an identifier corresponding to a second actual fragment 1160. A third element of the actual fragment map 1130 may include an identifier corresponding to the actual fragment 1150. Finally, a fourth element of the actual fragment map 1130 may include an identifier corresponding to a third actual fragment 1170. In Block A 1110, the third actual fragment 1170 may be in a condition of data skew.

Block B 1120 may refer to a state in which the fourth element of the actual fragment map 1140 may include a data skew flag represented by the small letter 'x' in the figure. The presence of the data skew flag may indicate that the fourth element of the actual fragment map 1140 may now maps to all of actual fragment 1150, second actual fragment 1160, and third actual fragment 1170. Furthermore, the information previously stored on the third actual fragment 1170 may now have been moved to each of actual fragment 1150 and second actual fragment 1160.

Figure 12:
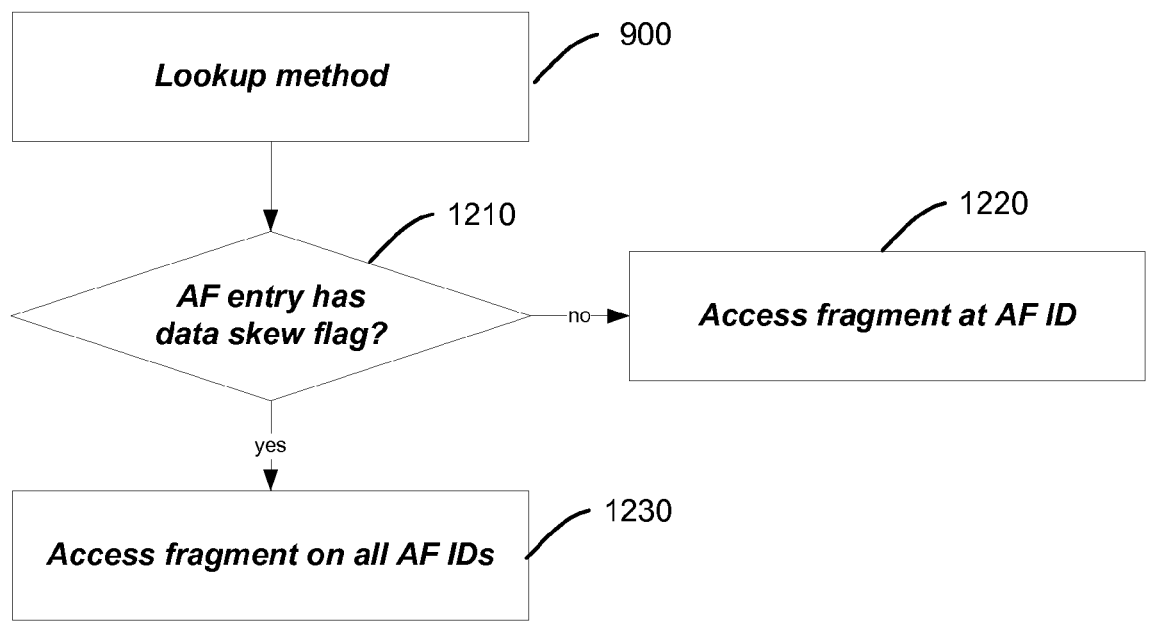
FIG. 12 is a flow diagram showing an example method for looking up an identifier of a physical location of a fragment with data skew using a fragment identifier.

FIG. 12 is a flow diagram showing an example method for looking up an identifier of a physical location of a fragment with data skew using a fragment identifier 1200.

Block 900 may refer to the example method for looking up an identifier of a physical location of a fragment using a fragment identifier described in FIG. 9.

Block 1210 may refer to a determination as to whether the fragment looked up at block 900 maps to an element of the fragment map that includes a data skew flag. Such a determination may take any form. For example, the element corresponding to the fragment may be read and the information returned may be queried to determine if the information includes a data skew flag. In response to a negative determination, flow continues to block 1220. In response to a positive determination, flow continues to block 1230.

Block 1220 may refer to an operation in which information is read from the fragment identified at block 900.

Block 1230 may refer to an operation in which information is read from each fragment in the fragment map.

Figure 13:
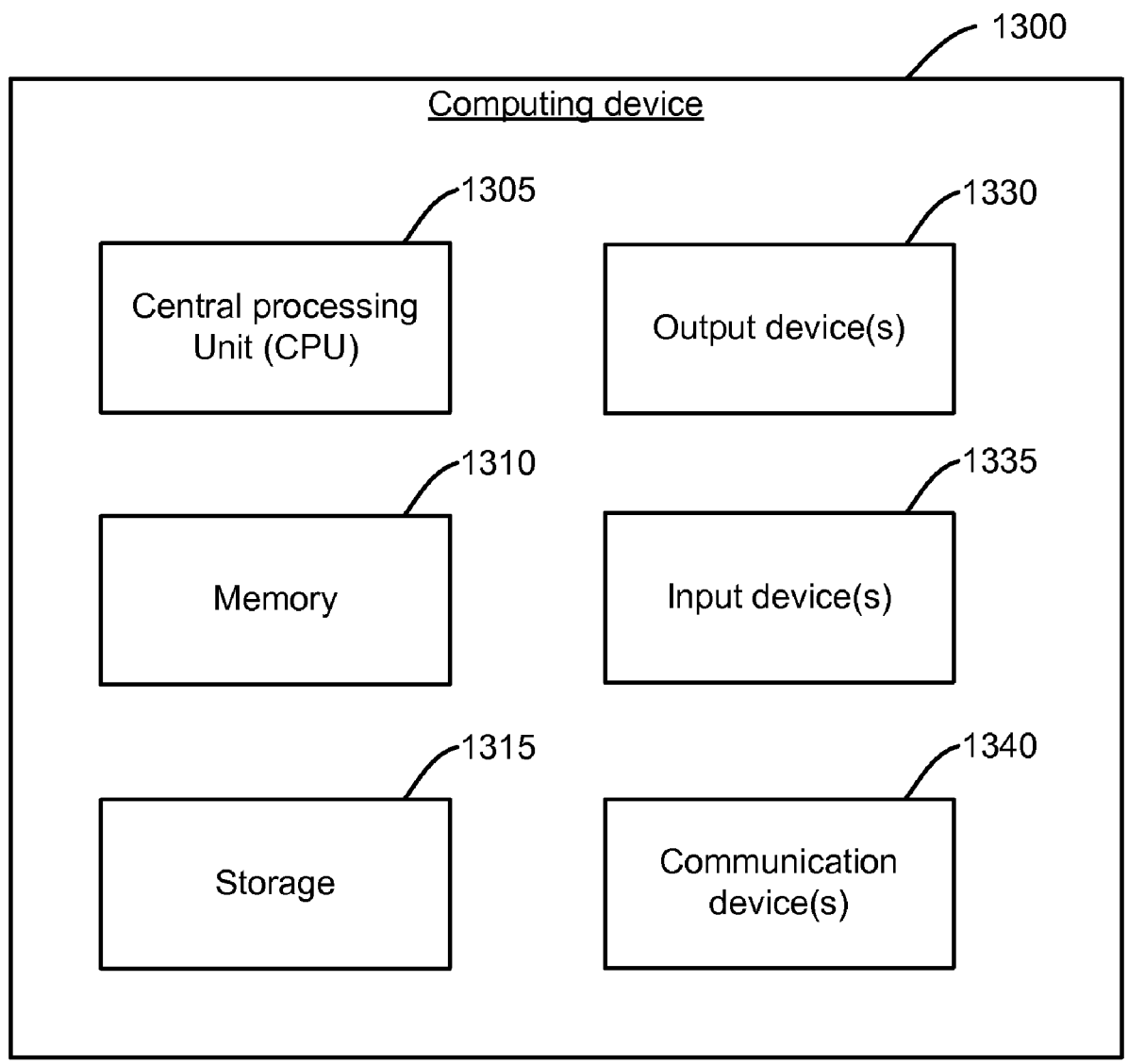
FIG. 13 shows an example computer device for implementing the described systems and methods.

FIG. 13 shows an example computer device 1300 for implementing the described systems and methods. In its most basic configuration, computing device 1300 typically includes at least one central processing unit (CPU) 1305 and memory 1310.

Depending on the exact configuration and type of computing device, memory 1310 may be volatile (such as RAM), non-volatile (such as ROM, flash memory, etc.) or some combination of the two. Additionally, computing device 1300 may also have additional features/functionality. For example, computing device 1300 may include multiple CPU's. The described methods may be executed in any manner by any processing unit in computing device 1300. For example, the described process may be executed by multiple CPU's in parallel.

Computing device 1300 may also include additional storage (removable and/or non-removable) including, but not limited to, magnetic or optical disks or tape. Such additional storage is illustrated in FIG. 13 by storage 1315. Computer storage media includes volatile and nonvolatile, removable and non-removable media implemented in any method or technology for storage of information such as computer readable instructions, data structures, program modules or other data. Memory 1310 and storage 1315 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1300. Any such computer storage media may be part of computing device 1300.

Computing device 1300 may also contain communications device(s) 1340 that allow the device to communicate with other devices. Communications device(s) 1340 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media or device-readable media as used herein includes both computer storage media and communication media. The described methods may be encoded in any computer-readable media in any form, such as data, computer-executable instructions, and the like.

Computing device 1300 may also have input device(s) 1335 such as keyboard, mouse, pen, voice input device, touch input device, etc. Output device(s) 1330 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer readable media having device-executable instructions for performing steps comprising:
   identifying a fragment that has grown too large;
   determining if the fragment is referenced more than one times in an actual fragment map;
   increasing the size of the actual fragment map; selecting a new token to identify a new actual fragment; and modifying an entry in the actual fragment map with the new token.

2. The one or more computer readable media computer readable media as recited in claim 1, wherein increasing the size of the actual fragment map doubles the size of the actual fragment map.

3. The one or more computer readable media as recited in claim 1, wherein data associated with the new token is moved from the fragment to the new fragment.

4. The one or more computer readable media as recited in claim 1, wherein the fragment is a subset of the dataset.

5. The one or more computer readable media as recited in claim 1, wherein the actual fragment map is an array.

6. The one or more computer readable media as recited in claim 1, further comprising modifying at least one entry in an actual fragment map.

7. One or more computer readable media having device-executable instructions for performing steps comprising:
   identifying a fragment of a size that has fallen below a predetermined threshold; identifying a merge partner for the fragment in an actual fragment map;
   modifying an entry corresponding to the fragment in the actual fragment map with an identifier of the merge partner; and
   reducing the size of the actual fragment map if the actual fragment map can be reduced.

8. The one or more computer readable media of claim 7, further comprising moving data associated with the fragment to a physical storage associated with the merge partner.

9. The one or more computer readable media of claim 7, wherein the fragment is a subset of the data set.

10. The one or more computer readable media of claim 7, wherein the size of the actual fragment map is reduced by a factor of two.

11. The one or more computer readable media of claim 7, further comprising modifying at least one entry in an actual fragment map.

* * * * *